US009715898B2

(12) United States Patent
Islam et al.

(10) Patent No.: US 9,715,898 B2
(45) Date of Patent: Jul. 25, 2017

(54) METHOD AND DEVICE FOR COMPRESSED-DOMAIN VIDEO EDITING

(75) Inventors: Asad Islam, Richardson, TX (US); Fehmi Chebil, Irving, TX (US)

(73) Assignee: Core Wireless Licensing S.A.R.L., Luxembourg (LU)

(*) Notice: Subject to any disclaimer, the term of this patent is extended or adjusted under 35 U.S.C. 154(b) by 961 days.

(21) Appl. No.: 10/798,824

(22) Filed: Mar. 10, 2004

(65) Prior Publication Data

US 2005/0201723 A1    Sep. 15, 2005

(51) Int. Cl.
- G11B 27/00 (2006.01)
- H04N 5/93 (2006.01)
- H04N 9/80 (2006.01)
- G11B 27/031 (2006.01)

(52) U.S. Cl.
CPC .................... G11B 27/031 (2013.01)

(58) Field of Classification Search
USPC ............................ 386/52, 278–290; 348/722
See application file for complete search history.

(56) References Cited

U.S. PATENT DOCUMENTS

| | | | |
|---|---|---|---|
| 5,396,497 A | 3/1995 | Veltman | 370/100.1 |
| 5,477,397 A * | 12/1995 | Naimpally et al. | 386/123 |
| 5,715,356 A | 2/1998 | Hirayama et al. | 386/96 |
| 6,104,441 A * | 8/2000 | Wee et al. | 375/240.15 |
| 6,151,359 A | 11/2000 | Acer et al. | 375/240 |
| 6,301,428 B1 | 10/2001 | Linzer | 386/52 |
| 6,314,139 B1 | 11/2001 | Koto et al. | 375/240.12 |
| 6,445,828 B1 | 9/2002 | Yim | 382/250 |
| 6,507,618 B1 * | 1/2003 | Wee et al. | 375/240.16 |
| 6,618,491 B1 * | 9/2003 | Abe | 382/107 |

(Continued)

FOREIGN PATENT DOCUMENTS

| EP | 0889 650 A2 | 1/1999 |
|---|---|---|
| EP | 0889650 A2 | 1/1999 |

(Continued)

OTHER PUBLICATIONS

IEEE 0-7803-6297-7/00; Egawa et al.; "Compressed Doman MPEG-2 Video Editing with VBV Requirement"; pp. 1016-1019; 2000.

(Continued)

*Primary Examiner* — Hung Dang
(74) *Attorney, Agent, or Firm* — Borden Ladner Gervais LLP (57) ABSTRACT

A method and device for editing a media file comprising input video frames. The editing device comprises a frame analyzer to determine whether the input video frames have the frame characteristics suitable for compressed domain editing or spatial domain editing. For those frames suitable for compressed domain editing, the frame analyzer provides frame data to a compressed domain processor so that video frame data can be modified in the compressed domain. For those frames only suitable for spatial domain editing, the frame analyzer provides frame data to a decoder and then to a spatial domain processor for frame data modification. The modified data at different domains are combined and converted to file format by a file format composer. Moreover, a file format parser is used to separate audio data from video data so that audio data can also be modified, if so desired.

31 Claims, 8 Drawing Sheets

(56) References Cited

U.S. PATENT DOCUMENTS

| | | | |
|---|---|---|---|
| 6,633,673 | B1 | 10/2003 | Shen .......................... 382/232 |
| 6,697,061 | B1 | 2/2004 | Wee et al. .................... 345/419 |
| 6,735,253 | B1* | 5/2004 | Chang .................. G11B 27/28 |
| | | | 375/240.16 |
| 6,747,707 | B2* | 6/2004 | Saito et al. .................... 348/722 |
| 6,973,130 | B1* | 12/2005 | Wee et al. ................ 375/240.16 |
| 7,590,329 | B2* | 9/2009 | Shinkai et al. .............. 386/278 |
| 2001/0017944 | A1* | 8/2001 | Kalevo ................. H04N 19/86 |
| | | | 382/268 |
| 2002/0090114 | A1 | 7/2002 | Rhoads et al. |
| 2002/0126754 | A1 | 9/2002 | Shen et al. ............... 375/240.12 |
| 2002/0133486 | A1* | 9/2002 | Yanagihara ....... G06F 17/30787 |
| 2002/0135608 | A1* | 9/2002 | Hamada et al. ............. 345/723 |
| 2003/0005329 | A1* | 1/2003 | Ikonen .......................... 713/201 |
| 2003/0067989 | A1 | 4/2003 | Yoshinari ................ 375/240.25 |
| 2006/0125819 | A1* | 6/2006 | Hakansson .................. 345/418 |

FOREIGN PATENT DOCUMENTS

| | | |
|---|---|---|
| EP | 0942605 A2 | 9/1999 |
| EP | 1005042 | 5/2000 |
| WO | WO00/45597 | 8/2000 |
| WO | WO 02/058401 A1 | 7/2002 |
| WO | WO 2004/057609 | 7/2004 |

OTHER PUBLICATIONS

IEEE 0-7803-3780-8/97, XP-000957700; Wee et al.; "Splicing MPEG Video Streams in the Compressed Domain"; pp. 225-230; 1997.

XP-002098562; Hurst et al.; "MPEG Splicing—Tutorial and Proposed SMPTE Standard"; pp. 105-117; 1997.

Canadian Intellectual Property Office, Application No. 2,558,392, Office Action dated May 23, 2012 with citation D4 (D1-D3 cited previously in USPTO prosecution), 3 pages total.

* cited by examiner

METHOD AND DEVICE FOR COMPRESSED-DOMAIN VIDEO EDITING

CROSS-REFERENCE TO RELATED PATENT APPLICATIONS

The present patent application is related to U.S. patent application Ser. No. 10/737,184, filed Dec. 16, 2003, assigned to the assignee of the present patent application. The present invention is also related to U.S. Patent Application No. 10/798,825, assigned to the assignee of the present application, filed even date herewith.

FIELD OF THE INVENTION

The present invention relates generally to video coding and, more particularly, to video editing.

BACKGROUND OF THE INVENTION

Digital video cameras are increasingly spreading among the masses. Many of the latest mobile phones are equipped with video cameras offering users the capabilities to shoot video clips and send them over wireless networks.

Digital video sequences are very large in file size. Even a short video sequence is composed of tens of images. As a result video is always saved and/or transferred in compressed form. There are several video-coding techniques, which can be used for this purpose. MPEG-4 and H.263 are the most widely used standard compression formats suitable for wireless cellular environments.

To allow users to generate quality video at their terminals, it is imperative to provide video editing capabilities to electronic devices, such as mobile phones, communicators and PDAs, that are equipped with a video camera. Video editing is the process of modifying available video sequences into a new video sequence. Video editing tools enable users to apply a set of effects on their video clips aiming to produce a functionally and aesthetically better representation of their video. To apply video editing effects on video sequences, several commercial products exist. However, these software products are targeted mainly for the PC platform.

Since processing power, storage and memory constraints are not an issue in the PC platform these days, the techniques utilized in such video-editing products operate on video sequences mostly in their raw formats in the spatial domain. In other words, the compressed video is first decoded, the editing effects are then introduced in the spatial domain, and finally the video is encoded again. This is known as spatial domain video editing operation.

The above scheme cannot be applied on devices, such as mobile phones, with low resources in processing power, storage space, available memory and battery power. Decoding a video sequence and re-encoding it are costly operations that take a long time and consume a lot of battery power.

Figure 1:
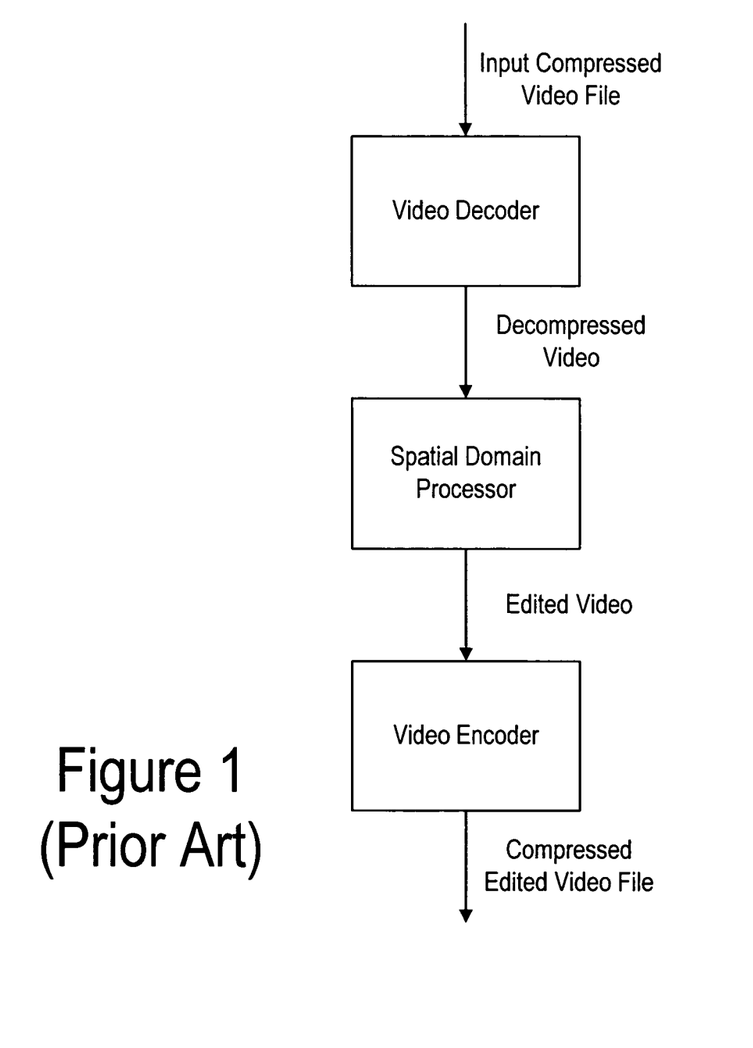
FIG. 1 is a block diagram illustrating the process of prior art video editing.

In prior art, video effects are performed in the spatial domain. More specifically, the video clip is first decompressed and then the video special effects are performed. Finally, the resulting image sequences are re-encoded. FIG. 1 illustrates the general procedure in conventional video editing. The major disadvantage of this approach is that it is significantly computationally intensive, especially the encoding part. Such a system is unsuitable for a mobile platform. Because of the requirements in spatial domain operations, video editing systems on mobile devices are rarely used, and the available editing features are also very limited.

It is thus advantageous and desirable to provide a method of video editing without the disadvantages of the prior art process.

SUMMARY OF THE INVENTION

The present invention provides a method and device for compressed-domain video editing, wherein a parser is used to separate audio data from video data in a media file so that the audio data and video data can be edited separately. In particular, a frame analyzer is used to determine whether the video data are suitable for compressed domain editing or spatial domain processing base on the frame characteristics of the input video frames.

Thus, the first aspect of the present invention provides a method of editing one or more input video frames in a bitstream for providing one or more edited video frames, the edited video frames including at least one editing effect specified by one or more editing parameters. The method comprises:

identifying frame characteristics of at least one input video frame in the bitstream; and modifying the bitstream in the compressed domain based on the frame characteristics of said at least one frame and the specified editing parameters for providing a modified bitstream indicative of said edited video frames.

According to the present invention, the input video frames contain video data and wherein said modifying comprises modification of the video data in a compression domain processor for providing edited frame data.

According to the present invention, the video data are coded with a variable-length code (VLC). The method further comprises:

converting the VLC coded video data into a binary form prior to said modification. It is possible that the method further comprises:

inversely quantizing the VLC coded video data prior to said converting, and processing the VLC coded video data in an inverse cosine transform operation prior to said converting.

According to the present invention, the method further comprises:

identifying frame characteristics of at least one further video frame in the bitstream;

modifying the bitstream in a further domain different from the compressed domain based on the frame characteristics of said at least one further video frame and the specified editing parameters for providing a further modified bitstream; and combining at least a part of the further modified bitstream with at least a part of the modified bitstream.

The further domain is a spatial domain or a file format domain.

According to the present invention, the method further comprises:

converting the edited frame data into an edited media file for use in a media player; and providing format information indicative of editing properties of the edited frame data so as to convert the edited frame data into the edited media file compatible to the media player.

According to the present invention, when the bitstream also contains audio data separable from the video data in the input video frames, the method further comprises:

combining the audio data with the edited frame data prior to said converting;

modifying the audio data prior to said combining, if so desired; and providing timing information so as to maintain synchronization between the audio data and edited frame data in said combining.

According to the present invention, the editing parameters are specified based on one or more editing preferences chosen by a user.

The second aspect of the present invention provides a media editing device for editing one or more input video frames in a bitstream for providing one or more edited video frames, the edited video frames including at least one editing effect specified by one or more editing parameters. The editing device comprises:

a frame analyzer module, responsive to signals indicative of video frame data, for identifying frame characteristics of at least one input video frame in the bitstream; and a compressed domain processing module, responsive to signals indicative of the frame characteristics, for modifying the video frame data based on the frame characteristics of said at least one frame and the specified editing parameters for providing modified video data indicative of said edited video frames.

According to the present invention, the frame analyzer further identifies frame characteristics of at least one further video frame in the bitstream. The editing device further comprises:

a spatial domain processing module, responsive to signals indicative of the frame characteristics of the further video frame, for modifying video frame data in the further video frame based on the frame characteristics of the further video frame and the specified editing parameters for providing further modified video data; and a module for combining at least a part of the further modified video data with at least a part of the modified video data.

According to the present invention, the editing device further comprises:

a format composer module, responsive to signals indicative of the modified video data, for converting the modified video data into an edited media file for use in a media player, and the frame analyzer module further identifies format information indicative of editing properties of the modified video data so as to convert the modified video data into the edited media file compatible to the media player.

The format composer module can be a file format composer or a media format composer.

According to the present invention, when the bitstream also comprises audio data, the editing device further comprises:

a format parser module, for separating the audio from the video frame data in the input video frames;

an audio processing module for modifying the audio data for providing modified audio data, if so desired;

a combination module for combining the modified video data and the modified audio data for providing combined signals indicative of the combined data; and a file or media format composer, responsive to the combined signals, for converting the combined data into an edited media file for use in a media player.

The third aspect of the present invention provides a communications device capable of editing media files for providing one or more editing effects in one or more edited video frames, the editing media files comprising one or more input video frames. The communications device comprises:

a video editing application module for allowing a user to specify the editing effects; and a video editing system comprising:

a compressed domain processing module, responsive to signals indicative of the input video frames, for modifying video frame data in one or more video frames based on the specified editing effects for providing modified video data indicative of said edited video frames; and a frame analyzer module, responsive to signals indicative of the video frame data, for identifying frame characteristics of at least one input video frame, so as to allow the compressed domain processing module to modify the video frame data also based on the frame characteristics.

According to the present invention, the frame analyzer further identifies frame characteristics of at least one further video frame in the bitstream, and the editing system further comprises:

a spatial domain processing module, responsive to signals indicative of the frame characteristics of the further video frame, for modifying video frame data in the further video frame based on the frame characteristics of the further video frame and the specified editing parameters for providing further modified video data;

a module for combining at least a part of the further modified video data with at least a part of the modified video data; and a format composer module, responsive to signals indicative of the modified video data, for converting the modified video data into an edited media file for use in a media player.

According to the present invention, the communications device further comprises:

a display screen for display video images based on modified video data.

The communications device can be a mobile terminal, a communicator device, a PDA or the like.

The fourth aspect of the present invention provides a software product for use in a video editing system for editing one or more input video frames in a bitstream for providing one or more edited video frames, the edited video frames including at least one editing effect specified by one or more editing parameters. The software product comprises:

a code for identifying frame characteristics of at least one input video frame in the bitstream; and a code for modifying video data in one or more input video frames in the compressed domain based on the frame characteristics of said at least one frame and the specified editing parameters so as to provide a modified video data indicative of said edited video frames.

According to the present invention, when the input video frames contain video data coded with variable-length code (VLC), the software product further comprises:

a code for converting the VLC coded video data into a binary form prior to modification of video data in one or more input video frames.

According to the present invention, the identifying code also identifies frame characteristics of at least one further input video frame and the software product further comprises:

a code for modifying video data in one or more further input video frames in a further domain different from the compressed domain based on the frame characteristics of said further input video frame and the specified editing parameters so as to provide modified further video data. The further domain can be a spatial domain or a file format domain.

According to the present invention, the software product further comprises a code for combining the modified further video data with the modified video data for providing the edited video frames; and a code for converting the modified video data into an edited media file for use in a media player.

The fifth aspect of the present invention provides a media coding system, comprising:

a media encoder for encoding media data for providing encoded media data in a plurality of frames having frame data;

a media editing device, responsive to the encoded media data, for providing edited data including one or more edited frames, the edited frames having a least one editing effect specified by one or more editing parameters, and a media decoder, responsive to the edited data, for providing decoded media data, wherein the editing device comprises:

a frame analyzer module, responsive to signals indicative of encoded data, for identifying frame characteristics of at least one frame in the encoded data; and a compressed domain processing module, responsive to signals indicative of the frame characteristics, for modifying the encoded frame data based on the frame characteristics of said at least one frame and the specified editing parameters for providing modified media data indicative of said edited media frames.

According to the present invention, the media encoder has a connectivity mechanism and the editing device has a further connectivity mechanism so as to allow the editing device to communicate with the media decoder in order to receive therefrom encoded media data in a wireless fashion.

According to the present invention, the media decoder has a connectivity mechanism and the editing device has a further connectivity mechanism so as to allow the editing device to provide the edited data to the media decoder in a wireless fashion.

According to the present invention, the media encoder and the editing system are integrated in an expanded encoding system.

According to the present invention, the media decoder has a connectivity mechanism and the expanded encoding system has a further connectivity mechanism so as to allow the expanded encoding system to provide the edited data to the media decoder in a wireless fashion.

According to the present invention, the media decoder and the editing system are integrated in an expanded decoding system.

According to the present invention, the media encoder has a connectivity mechanism and the expanded decoding system has a further connectivity mechanism so as to allow the media encoder to provide the edited data to the expanded decoding system in a wireless fashion.

According to the present invention, each of the connectivity mechanism and the further connectivity mechanism comprises a bluetooth connectivity module, an infra-red module, or a wireless LAN device.

The present invention will become apparent upon reading the description taken in conjunction with FIGS. 2-10.

DETAILED DESCRIPTION OF THE INVENTION

Figure 2:
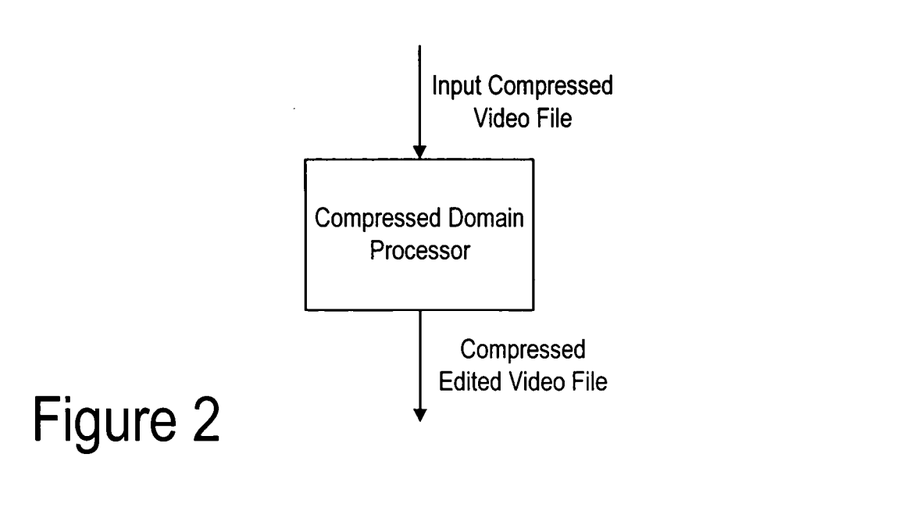
FIG. 2 is a schematic representation illustrating the principle of compressed-domain video editing, according to the present invention.
Figure 3:
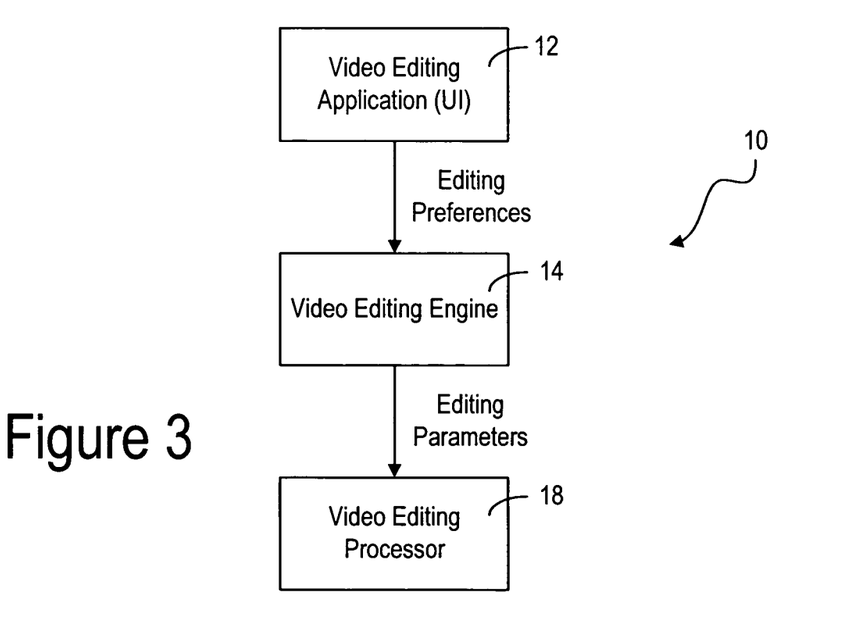
FIG. 3 is a block diagram illustrating a typical video editing system for mobile devices.

The video editing procedure, according to the present invention, is based on compressed domain operations. As such, it reduces the use of decoding and encoding modules. As shown in FIG. 2, the editing is carried out in a compressed domain processor. FIG. 3 illustrates a typical editing system designed for a communication device, such as a mobile phone. This editing system can incorporate the video editing method and device, according to the present invention. The video editing system 10, as shown in FIG. 3, comprises a video editing application module 12 (graphical user interface), which interacts with the user to exchange video editing preferences. The application uses the video editor engine 14, based on the editing preferences defined or selected by the user, to compute and output video editing parameters to the video editing process module 18. The video editing processor module 18 uses the principle of compressed-domain editing to perform the actual video editing operations. If the video editing operations are implemented in software, the video editing processor module 18 can be a dynamically linked library (dll). Furthermore, the video editor engine 14 and the video editing processor 18 can be combined into a single module.

Figure 4:
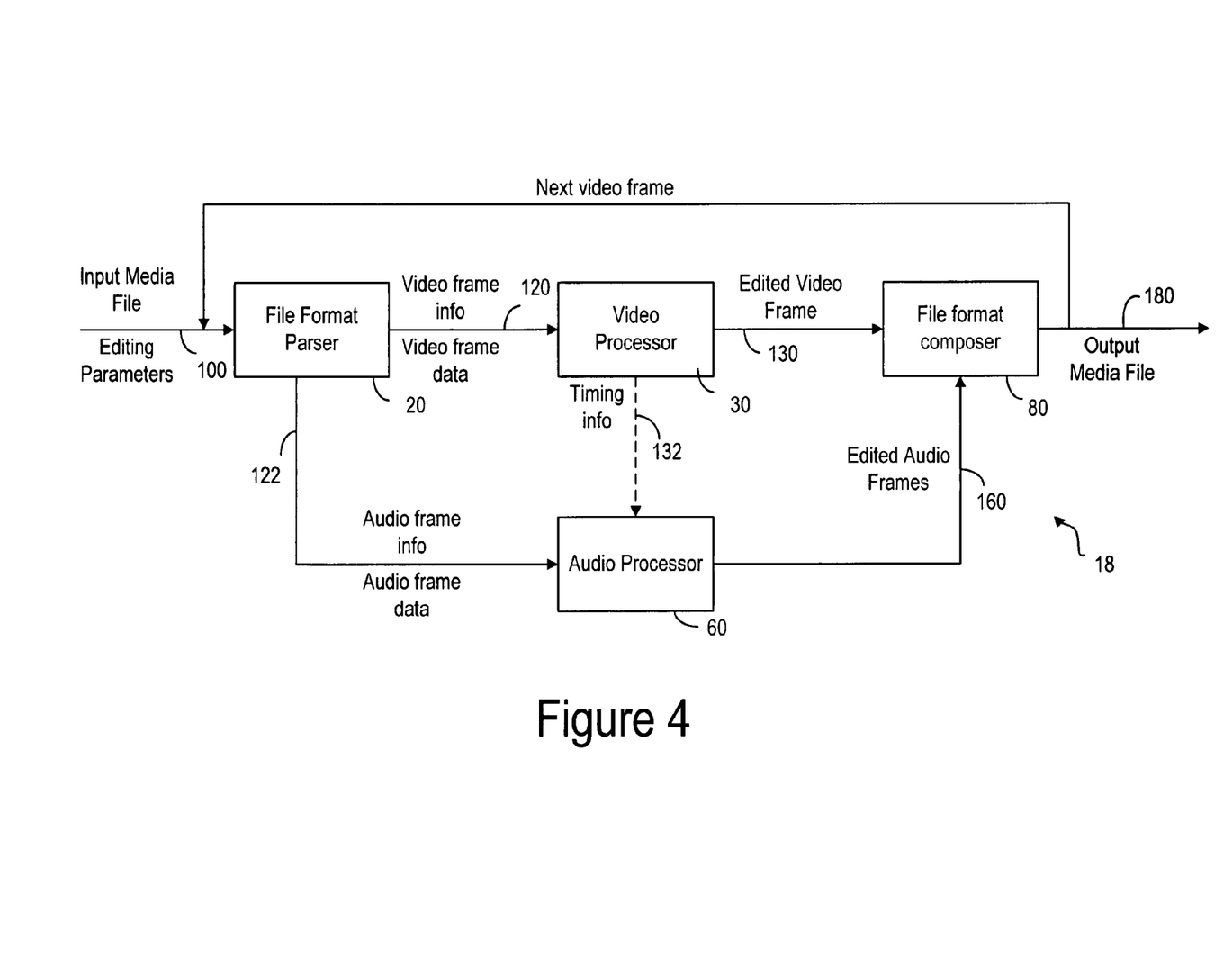
FIG. 4 is a block diagram illustrating a video editing processor system, according to the present invention.

A top-level block diagram of the video editing processor module 18 is shown in FIG. 4. As shown, the editing processor module 18 takes in a media file 100, which is usually a video file that may have audio embedded therein. The editing process module 18 performs the desired video and audio editing operations in the compressed domain, and outputs an edited media file 180. The video editing processor module 18 consists of four main units: a file format parser 20, a video processor 30, an audio processor 60, and a file format composer 80.

A. File Format Parser:

Media files, such as video and audio, are almost always in some standard encoded format, such as H.263, MPEG-4 for video and AMR-NB, CELP for audio. Moreover, the compressed media data is usually wrapped in a file format, such as MP4 or 3GP. The file format contains information about the media contents that can be effectively used to access, retrieve and process parts of the media data. The purpose of the file format parser is to read in individual video and audio frames, and their corresponding properties, such as the video frame size, its time stamp, and whether the frame is an intra frame or not. The file format parser 20 reads individual media frames from the media file 100 along with their frame properties and feeds this information to the media processor. The video frame data and frame properties 120 are fed to the video processor 30 while the audio frame data and frame properties 122 are fed to the audio processor 60, as shown in FIG. 4.

B. Video Processor

Figure 5:
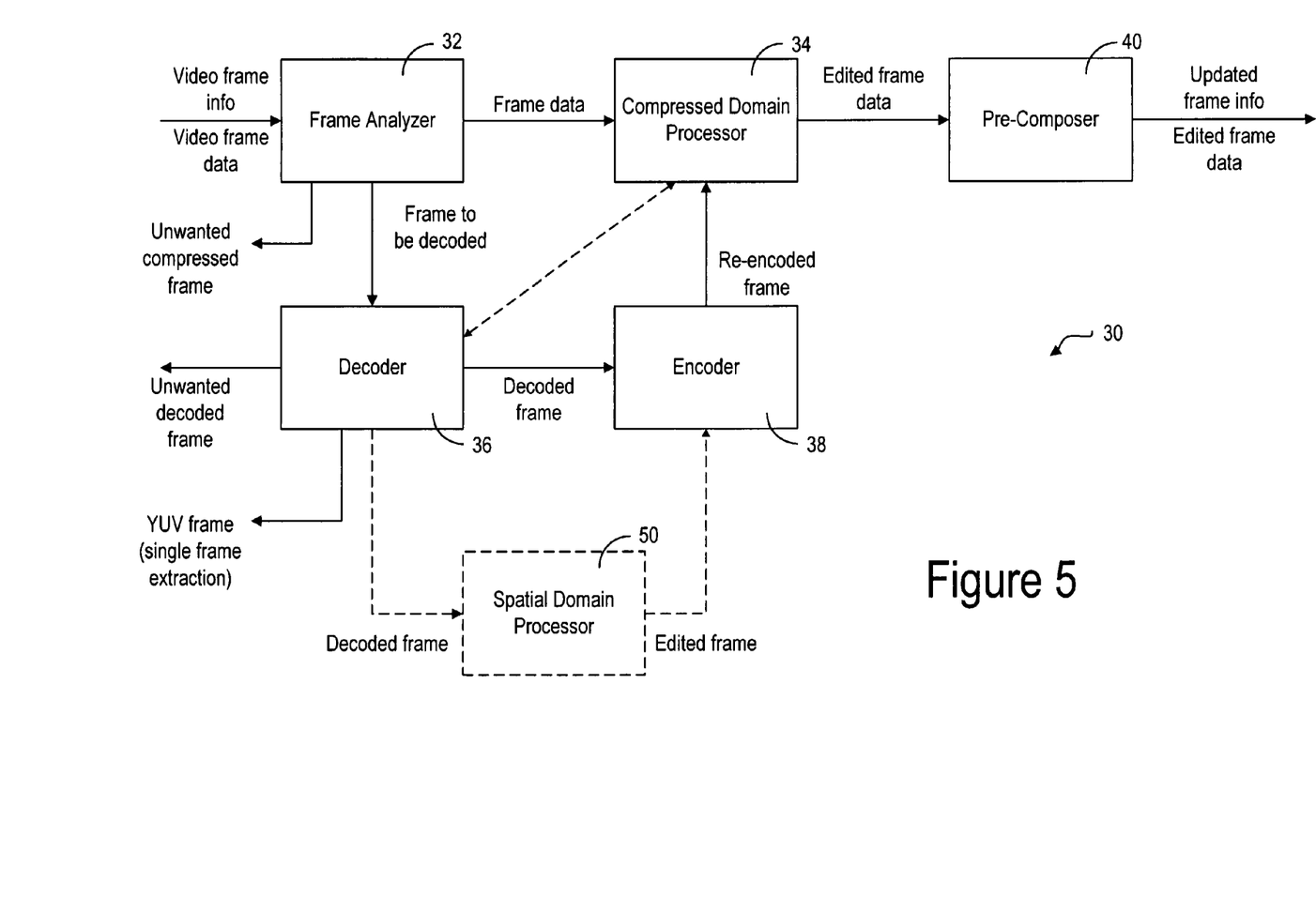
FIG. 5 is a block diagram illustrating a video processor, according to the present invention.

The video processor 30 takes in video frame data and its corresponding properties, along with the editing parameters (collectively denoted by reference numeral 120) to be applied on the media clip. The editing parameters are passed by the video editing engine 14 to the video editing processor module 18 in order to indicate the editing operation to be performed on the media clip. The video processor 30 takes these editing parameters and performs the editing operation on the video frame in the compressed domain. The output of the video processor is the edited video frame along with the frame properties, which are updated to reflect the changes in the edited video frame. The details of the video processor 30 are shown in FIG. 5. As shown, the video processor 30 consists of the following modules:

B.1. Frame Analyzer

Figure 8:
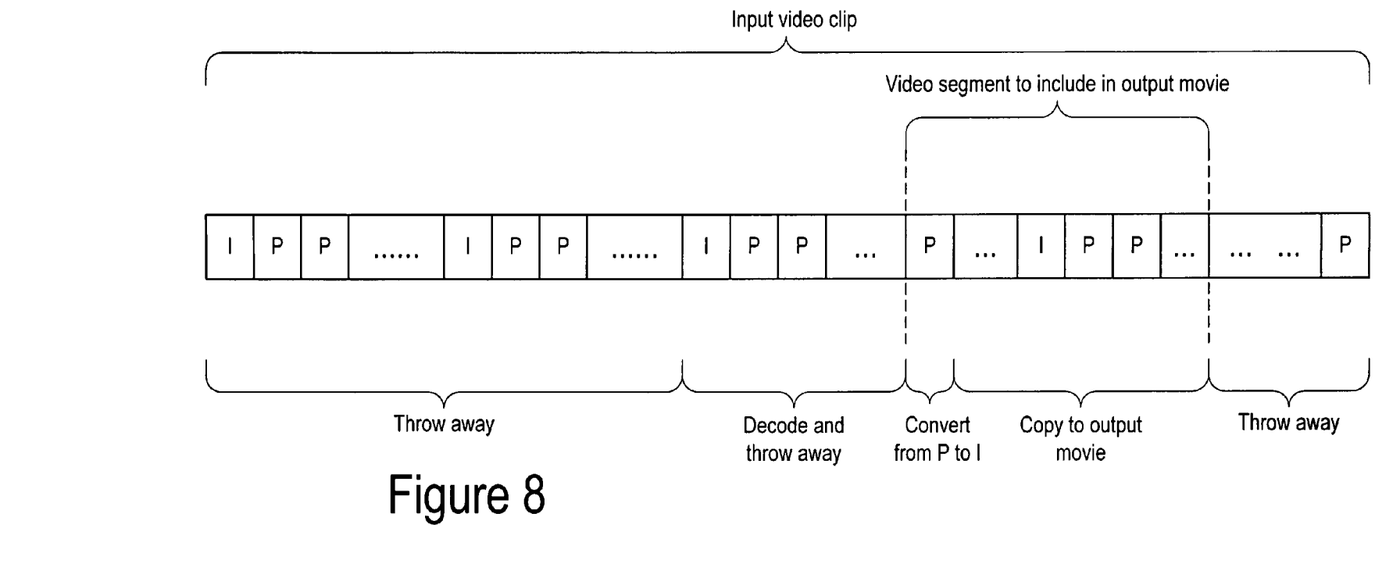
FIG. 8 is a schematic representation illustrating a typical video sequence to be edited.

The main function of the Frame Analyzer 32 is to look at the properties of the frame and determine the type of processing to be applied on it. Different frames of a video clip may undergo different types of processing, depending on the frame properties and the editing parameters. The Frame Analyzer makes the crucial decision of the type of processing to be applied on the particular frame. A typical video bitstream is shown in FIG. 8. Different parts of the bitstream will be acted upon in different ways, depending on the frame characteristics of the bitstream and the specified editing parameters. As shown in FIG. 8, some portions of the bitstream are not included in the output movie, and will be thrown away. Some will be thrown away only after being decoded. Others will be re-encoded to convert from P- to I-frame. Some will be edited in the compressed domain and added to the output movie, while still others will be simply copied to the movie without any changes. It is the job of the Frame Analyzer to perform all these crucial decisions.

B.2. Compressed Domain Processor

The core processing of the frame in the compressed domain is performed in the compressed domain processor 34. The compressed video data is changed to apply the desired editing effect. This module can perform various different kinds of operations on the compressed data. One of the common ones among them is the application of the Black & White effect where a color frame is changed to a black & white frame by removing the chrominance data from the compressed video data. Other effects that can be performed by this module are the special effects (such as color filtering, sepia, etc.) and the transitional effects (such as fading in and fading out, etc.) Note that the module is not limited only to these effects, but can be used to perform all possible kinds of compressed domain editing.

Video data is usually VLC (variable-length code) coded. Hence, in order to perform the editing in the compressed domain, the data is first VLC decoded so that data can be represented in regular binary form. The binary data is then edited according to the desired effect, and the edited binary data is then VLC coded again to bring it back to compliant compressed form. Furthermore, some editing effects may require more than VLC decoding. For example, the data is first subjected to inverse quantization and/or IDCT (inverse discrete cosine transform) and then edited. The edited data is re-quantized and/or subjected to DCT operations to compliant compressed form.

B.3. Decoder

Although the present invention is concerned with compressed domain processing, there is still a need to decode frames. As shown in FIG. 5, the video processor 30 comprises a decoder 36, operatively connected to the frame analyzer 32 and the compressed domain processor 34, possibly via an encoder 38. Take the video bitstream shown in FIG. 8 as an example, if the beginning cut point in the input video falls on a P-frame, then this frame simply cannot be included in the output movie as a P-frame. The first frame of a video sequence must always start with an I-frame. Hence, there is a need to convert this P-frame to an I-frame.

In order to convert the P-frame to an I-frame, the frame must first be decoded. Moreover, since it is a P-frame, the decoding must start all the way back to the first I-frame preceding the beginning cut point. Hence, the relevant decoder is required to decode the frames by the decoder 36 from the preceding I-frame to the first included frame. This frame is then sent to the encoder 38 for re-encoding.

B.4. Spatial Domain Processor

It is possible to incorporate a spatial domain processor 50 in the compressed domain editing system, according to the present invention. The spatial domain processor 50 is used mainly in the situation where compressed domain processing of a particular frame is not possible. There may be some effects, special or transitional, that are not possible to apply directly to the compressed binary data. In such a situation, the frame is decoded and the effects are applied in the spatial domain. The edited frame is then sent to the encoder for re-encoding.

Figure 6:
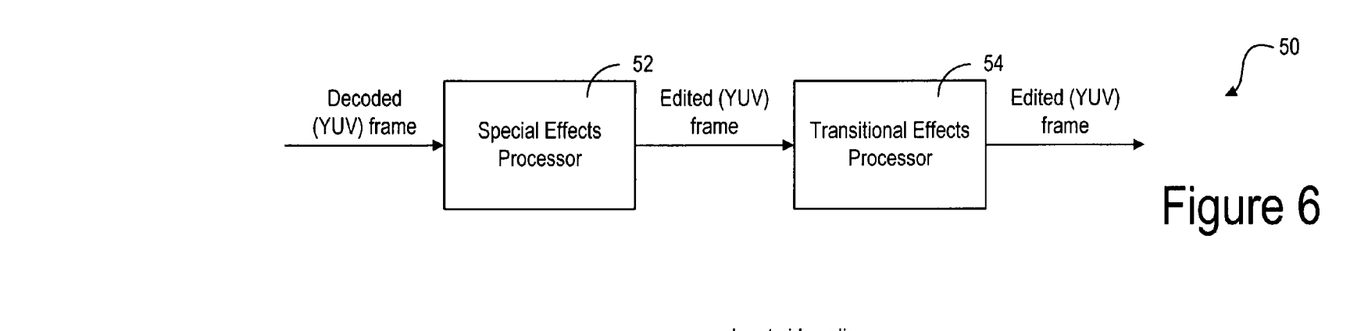
FIG. 6 is a block diagram illustrating a spatial domain video processor.

The Spatial Domain Processor 50 can be decomposed into two distinct modules, as shown in FIG. 6. The Special Effects Processor 52 is used to apply special effects on the frame (such as Old Movie effect, etc.). The Transitional Effects Processor 54 is used to apply transitional effects on the frame (such as Slicing transitional effect, etc).

B.5. Encoder

If a frame is to be converted from P- to I-frame, or if some effect is to be applied on the frame in the spatial domain, then the frame is decoded by the decoder and the optional effect is applied in the spatial domain. The edited raw video frame is then sent to the encoder 38 where it is compressed back to the required type of frame (P- or I-), as shown in FIG. 5.

B.6. Pre-Composer

The main function of the Pre-Composer 40 as shown in FIG. 5 is to update the properties of the edited frame so that it is ready to be composed by the File Format Composer 80 (FIG. 4).

When a frame is edited in the compressed domain, the size of the frame changes. Moreover, the time duration and the time stamp of the frame may change. For example, if slow motion is applied on the video sequence, the time duration of the frame, as well as its time stamp, will change. Likewise, if the frame belongs to a video clip that is not the first video clip in the output movie, then the time stamp of the frame will be translated to adjust for the times of the first video clip, even though the individual time duration of the frame will not change.

If the frame is converted from a P-frame to an I-frame, then the type of the frame changes from inter to intra. Also, whenever a frame is decoded and re-encoded, it will likely cause a change in the coded size of the frame. All of these changes in the properties of the edited frame must be updated and reflected properly. The composer uses these frame properties to compose the output movie in the relevant file format. If the frame properties are not updated correctly, the movie cannot be composed.

C. Audio Processor

Video clips usually have audio embedded inside them. The audio processor 60, as shown in FIGS. 4 and 7, is used to process the audio data in the input video clips in accordance with the editing parameters to generate the desired audio effect in the output movie.

Figure 7:
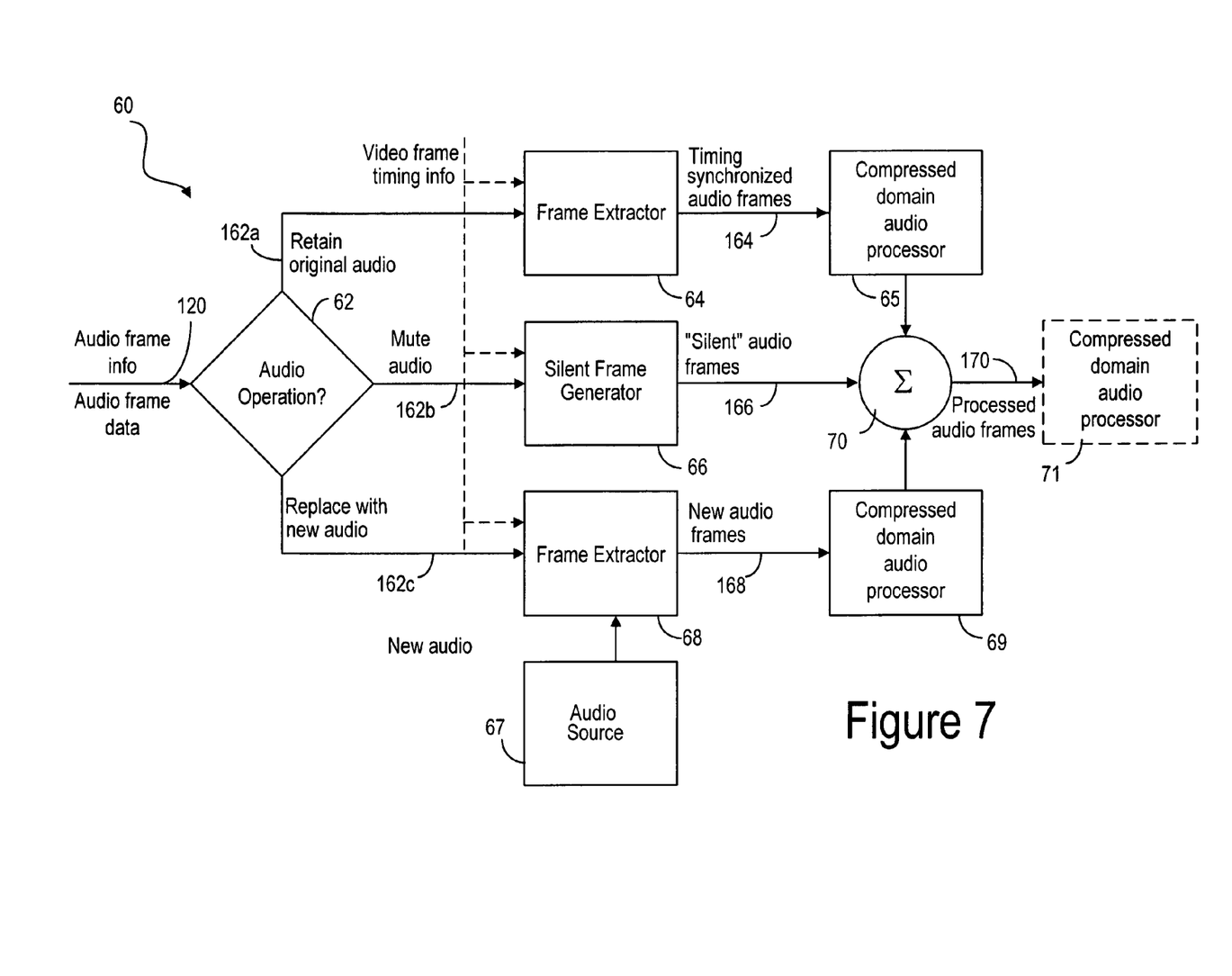
FIG. 7 is a block diagram illustrating an audio processor.

There can be many different kinds of audio operations in the editing system, as shown in FIG. 7. The most common among these operations are: retaining original audio, replacing new audio and muting audio, for example. Upon receiving the audio frame data and audio frame information 121, including the desired audio effect specified by the editing parameters, from the file format parser 20, an information processor 62 finds out what kinds of audio operations are specified and sends the different data in the audio frame data to different audio processing modules for processing.

C.1. Retain Original Audio

The most common case in audio data processing in the audio processor is to retain the original audio in the edited video clip. In this case, the necessary video frames are extracted from the video clip 162a and included in the output edited clip 164 by a frame extractor module 64. It is crucial that proper audio/video synchronization must be maintained when including original audio. A video clip may be cut from any arbitrary point. The cut points of the video and audio must match exactly in order to avoid any audio drift in the edited video clip. For that matter, timing information 132 about the video is supplied to the audio processor for synchronization. With a compressed-domain audio processor 65, it is possible to process the audio frame 164 in the compressed-domain. For example, if the processor 65 includes various sub-modules and software programs, various compressed-domain operations such as audio fading, audio filtering, audio mixing, special audio effects and the like can be achieved.

C.2. Replace New Audio

It is also possible for the audio processor to include audio from another source and replace the original audio in the video clip with the new audio sample. Also, it is possible to insert this new audio sample at any point in the output movie and for any duration of the output movie. If the new audio sample has a shorter duration than the duration to insert, then the audio processor is able to loop the audio so that it plays back repeatedly for the total duration of the audio insertion. For audio data replacement purposes, a frame extractor 68 (which could be the same extractor 64) operatively connected to an audio source 67 to obtain a new audio sample 167 and output the new audio sample as new audio frames 168 at proper timing. With a compressed-domain audio processor 69, it is possible to process the audio frame 168 in the compressed-domain. For example, if the processor 69 includes various sub-modules and software programs, various compressed-domain operations such as audio fading, audio filtering, audio mixing, special audio effects and the like can be achieved.

C.3. Mute Audio

The audio processor is also able to mute the original audio for any duration of the output movie, so that the edited movie does not have any audio for the duration of the mute. There are different ways of muting audio in the movie. It is possible that the audio processor simply does not provide any audio frames for the particular duration when audio is to be muted. Alternatively, a silent frame generator 66 is used to insert "silent" audio frames 166 into the audio frame data such that, when played back, the audio frames give the effect of silence or mute in the output movie.

The output from various audio processing modules, such as the frame extractors 64, 68 and the silent frame generator 66, are combined in an audio frame combination module 70 for providing the processed audio frames 170. The output 170 from the audio frame combination module 70 can further be subjected to compressed-domain audio processing by which the inserted audio frames are edited in the compressed domain to change their contents by a compressed domain audio processor 71. The audio processor 71 can be used in addition to the audio processors 65 and 67, or instead of the audio processors 65 and 67.

It should be noted that audio processing is not limited to these three operations only. There can be any number of various audio processing capabilities included in the audio processor, such as audio mixing, multiple audio channel support, etc. The above discussion is for illustrative purposes only.

Audio frames are generally shorter in duration than their corresponding video frames. Hence, more than one audio frame is generally included in the output movie for every video frame. Therefore, an adder is needed in the audio processor to gather all the audio frames corresponding to the particular video frame in the correct timing order. The processed audio frames are then sent to the composer for composing them in the output movie.

D. File Format Composer

Once the media frames (video, audio, etc.) have been edited and processed, they are sent to the File Format Composer 80, as shown in FIG. 4. The composer 80 receives the edited video 130 and audio frames 160, along with their respective frame properties, such as frame size, frame timestamps, frame type (e.g., P- or I-), etc. It then uses this frame information to compose and wrap the media frame data in the proper file format and with the proper video and audio timing information. The result is the final edited media file 180 in the relevant file format, playable in any compliant media player.

Figure 9:
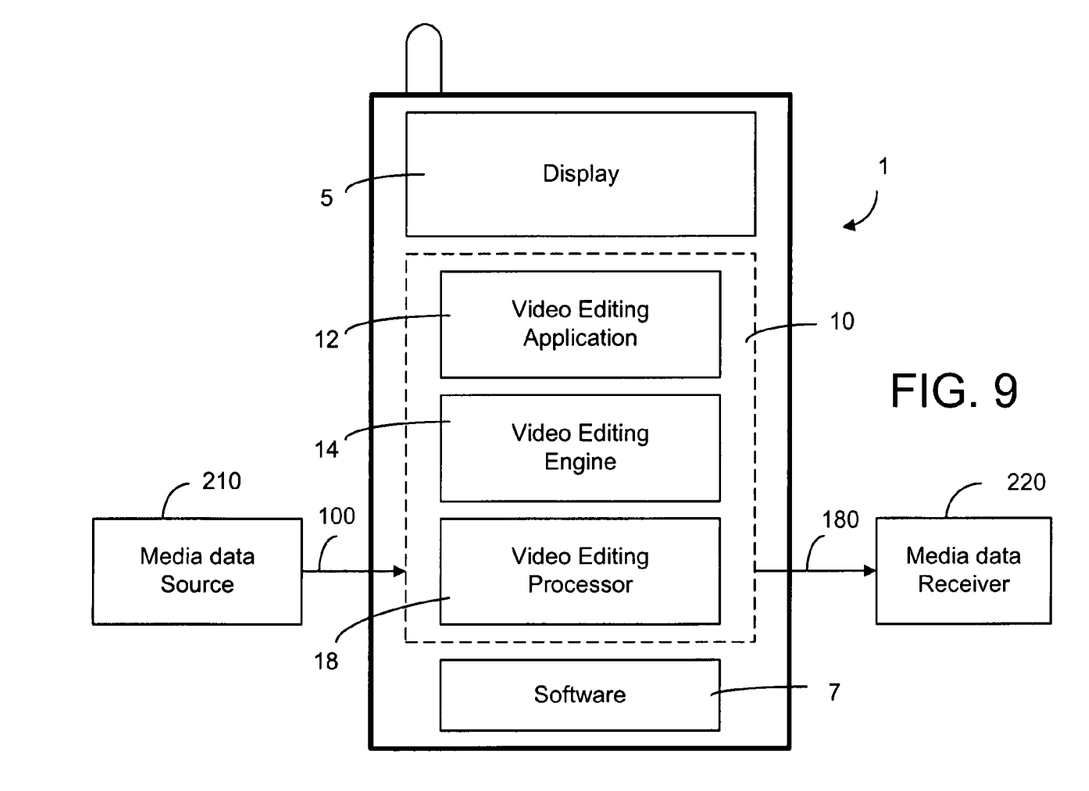
FIG. 9 is a schematic representation illustrating a portable device, which can carry out compressed-domain video editing, according to the present invention.

The present invention, as described above, provides the advantage that the video editing operations can be implemented in a small portable devices, such as a mobile phone, a communicator, a personal digital assistant (PDA) that is equipped with a video camera or capable of receiving video data from an external source. FIG. 9 is a schematic representation of a portable device, which can be used for compressed-domain video editing, according to the present invention. As shown in FIG. 9, the portable device 1 comprises a display 5, which can be used to display a video image, for example. The device 1 also comprises a video editing system 10, including a video editing application 12, a video editing engine 12 and a video editing processor 18 as shown in FIG. 3. The video editing processor 18 receives input media file 100 from a media file source 210 and conveyed the output media file 180 to a media file receiver 220. The media file source 210 can be a video camera, which can be a part of the portable device 1. However, the media file source 210 can be a video receiver operatively connected to a video camera. The video receiver can be a part of the portable device. Furthermore, the media file source 210 can be a bitstream receiver, which is a part of the portable device, for receiving a bitstream indicative of the input media file. The edited media file 180 can be displayed on the display 5 of the portable device 1. However, the edited media file 180 can be conveyed to the media file receiver, such as a storage medium, a video transmitter. The storage medium and the video transmitter can also be part of the portable device. Moreover, the media file receiver 220 can also be an external display device. It should be noted the portable device 1 also comprises a software program 7 to carry out many of the compressed-domain editing procedures as described in conjunction with FIGS. 4, 5 and 7. For example, the software program 7 can be used for file format parsing, file format composing, frame analysis and compressed domain frame processing.

Figure 10:
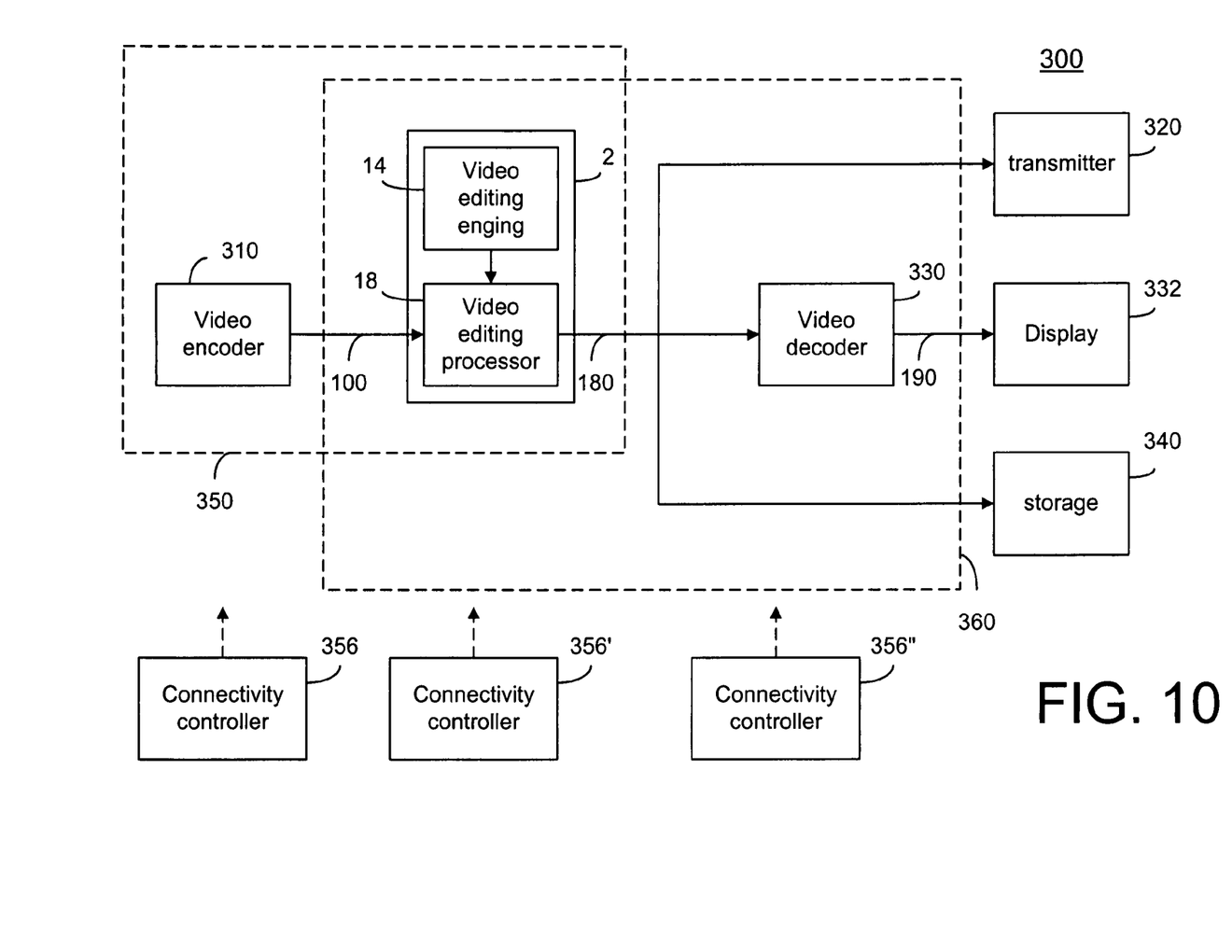
FIG. 10 is a block diagram illustrating a media coding system, which includes a video processor, according to the present invention.

It should be noted that, the compressed domain video editing processor 18 of the present invention can be incorporated into a video coding system as shown in FIG. 10. As shown in FIG. 10, the coding system 300 comprises a video encoder 310, a video decoder 330 and a video editing system 2. The editing system 2 can be incorporated in a separate electronic device, such as the portable device 1 in FIG. 9. However, the editing system 2 can also be incorporated in a distributed coding system. For example, the editing system 2 can be implemented in an expanded decoder 360, along with the video decoder 330, so as to provide decoded video data 190 for displaying on a display device 332. Alternatively, the editing system 2 is implemented in an expanded encoder 350, along with the video encoder 310, so as to provide edited video data to a separate video decoder 330. The edited video data can also be conveyed to a transmitter 320 for transmission, or to a storage device 340 for storage.

Some or all of the components 2, 310, 320, 330, 332, 340, 350, 360 can be operatively connected to a connectivity controller 356 (or 356', 356") so that they can operate as remote-operable devices in one of many different ways, such as bluetooth, infra-red, wireless LAN. For example, the expanded encoder 350 can communicate with the video decoder 330 via wireless connection. Likewise, the editing system 2 can separately communicate with the video encoder 310 to receive data therefrom and with the video decoder 330 to provide data thereto.

Thus, although the invention has been described with respect to one or more embodiments thereof, it will be understood by those skilled in the art that the foregoing and various other changes, omissions and deviations in the form and detail thereof may be made without departing from the scope of this invention.

What is claimed is:

1. A method of editing one or more input video frames in a bitstream for providing one or more edited video frames to achieve a video effect, the edited video frames including at least one editing effect specified by one or more editing parameters, the method comprising:
    identifying, via a frame analyzer incorporated within a mobile phone equipped with a camera, frame characteristic of at least one entire input video frame in the bitstream;
    determining, via the frame analyzer incorporated within the mobile phone, whether video data of the at least one entire input video frame is suitable for compressed domain editing or spatial domain processing, based on the frame characteristics of the at least one entire input video frame and the at least one editing effect specified by one or more editing parameters;
    responsive to a determination that the video data of the at least one entire input video frame in the bitstream is suitable for compressed domain editing, modifying the bitstream in the compressed domain for providing a modified bitstream indicative of said edited video frames;
    responsive to a determination that the video data is suitable for spatial domain processing, decoding the at least one entire input video frame into the spatial domain to provide a decoded bitstream, modifying the decoded bitstream in the spatial domain for providing a modified bitstream indicative of the edited video frames; and
    combining at least a part of the modified bitstream in the compressed domain with at least a part of the modified bitstream.

2. The method of claim 1, wherein the video data is coded with a variable length code, said method further comprising:
    converting the variable length code coded video data into a binary form prior to said modifying.

3. The method of claim 2, further comprising:
    processing the variable length code coded video data in an inverse cosine transform operation prior to said converting.

4. The method of claim 1, further comprising:
    modifying one or more further input video frames in the bitstream in a further domain different from the compressed domain for providing a further modified video bitstream, wherein said further domain comprises a file format domain.

5. The method of claim 1, wherein the modified bitstream comprises edited frame data, said method further comprising:
    converting the edited frame data into an edited media file.

6. The method of claim 5, wherein the edited frame data is converted based on format information indicative of editing properties of the edited frame data.

7. The method of claim 1, wherein the one or more editing parameters are based on one or more editing preferences chosen by a user.

8. The method of claim 1, wherein the video effect comprises a color-change effect.

9. An apparatus for editing one or more input video frames in a bitstream for providing one or more edited video frames to achieve a video effect, the edited video frames including at least one editing effect specified by one or more editing parameters, the apparatus comprising:
    a frame analyzer module, responsive to signals indicative of video frame data, for identifying frame characteristics of at least one entire input video frame in the bitstream, and determining whether the video frame data of the at least one entire input video frame is suitable for compressed domain editing or spatial domain processing, based on the frame characteristics of the at least one entire input video frame and the at least one editing effect specified by one or more editing parameters;
    a compressed domain processing module, responsive to a determination that the video frame data of the at least one entire input video frame in the bitstream is suitable for compressed domain editing, for modifying the bitstream in the compressed domain for providing a modified bitstream indicative of said edited video frames;
    a decoder, responsive to a determination that the video frame data is suitable for spatial domain processing, for decoding the bitstream of the at least one entire input video frame into the spatial domain to provide a decoded bitstream;
    a spatial domain module, responsive to a determination that the video frame data is suitable for spatial domain processing, for modifying the decoded bitstream in the spatial domain for providing a modified bitstream indicative of the edited video frames; and wherein the apparatus comprises a mobile phone equipped with a camera.

10. The apparatus of claim 9, further comprising:
a format composer module for converting the modified video data into an edited media file.

11. The apparatus of claim 10, wherein the format composer module comprises a file format composer.

12. The apparatus of claim 10, wherein the format composer module comprises a media format composer.

13. The apparatus of claim 10, wherein the frame analyzer module is further adapted for identifying format information indicative of editing properties of the modified video data so as to convert the modified video data into the edited media file compatible to a media player.

14. The apparatus of claim 9, wherein the bitstream also comprises audio data, said apparatus further comprising:
a format parser module, for separating the audio from the video frame data in the input video frames; and
an audio processing module adapted for modifying the audio data for providing modified audio data, if so desired.

15. The apparatus of claim 14, further comprising:
a combination module for combining the modified video data and the modified audio data for providing combined signals indicative of combined data.

16. The apparatus of claim 15, further comprising:
a format composer, responsive to the combined signals, for converting the combined data into an edited media file for use in a media player.

17. A mobile phone equipped with a camera, comprising:
a media encoder for encoding media data for providing encoded media data in a plurality of frames, wherein the plurality of frames comprise frame data;
a media editing device, responsive to the encoded media data, for providing edited data including one or more edited frames, the edited frames having at least one editing effect specified by one or more editing parameters; a media decoder, responsive to the edited data, for providing decoded media data, wherein the media editing device comprises:
a frame analyzer, responsive to signals indicative of video frame data, for identifying frame characteristics of at least one entire input video frame in a bitstream, and determining whether the video frame data of the at least one entire input video frame is suitable for compressed domain editing or spatial domain processing, based on the frame characteristics of the at least one entire input video frame and the at least one editing effect specified by one or more editing parameters;
a compressed domain processor, responsive to a determination that the video frame data of the at least one entire input video frame in the bitstream is suitable for compressed domain editing, for modifying the bitstream in the compressed domain for providing a modified bitstream indicative of said edited video frames;
a decoder, responsive to a determination that the video frame data is suitable for spatial domain processing, for decoding the bitstream of the at least one entire input video frame into the spatial domain to provide a decoded bitstream;
a spatial domain processor, responsive to a determination that the video frame data is suitable for spatial domain processing, for modifying the decoded bitstream in the spatial domain for providing a modified bitstream indicative of the edited video frames, wherein the spatial domain processor comprises:
a special effect processor for modifying the video frame data in the spatial domain if the video effect is a special effect; and
a transitional effect processor for modifying the video frame data in the spatial domain if the video effect is a transitional effect.

18. The mobile phone of claim 17, wherein the media encoder comprises a connectivity mechanism and the media editing device comprises a further connectivity mechanism for allowing the media editing device to communicate with the media encoder in order to receive therefrom encoded media data in a wireless fashion.

19. The mobile phone of claim 17, wherein the media decoder comprises a connectivity mechanism and the media editing device comprises a further connectivity mechanism for allowing the media editing device to provide the edited data to the media decoder in a wireless fashion.

20. The mobile phone of claim 17, wherein the media encoder and the media editing device are integrated in an expanded encoding module.

21. The mobile phone of claim 20, wherein the media decoder comprises a connectivity mechanism and the expanded encoding module comprises a further connectivity mechanism for allowing the expanded encoding module to provide the edited data to the media decoder in a wireless fashion.

22. The mobile phone of claim 21, wherein each of the connectivity mechanism and the further connectivity mechanism comprises a bluetooth connectivity module.

23. The mobile phone of claim 21, wherein each of the connectivity mechanism and the further connectivity mechanism comprises an infra-red connectivity module.

24. The mobile phone of claim 17, wherein the media decoder and the media editing device are integrated in an expanded decoding module.

25. The mobile phone of claim 24, wherein the media encoder comprises a connectivity mechanism and the expanded decoding module comprises a further connectivity mechanism for allowing the media encoder to provide the edited data to the expanded decoding module in a wireless fashion.

26. A mobile phone equipped with a camera for editing media files in a bitstream, the bitstream comprising a video bitstream and an audio bitstream, wherein the video bitstream comprises a plurality of input video frames having video frame data for providing one or more edited video frames to achieve a video effect, the edited video frames including at least one editing effect specified by one or more editing parameters, the mobile phone comprising:
a video editing device comprising:
an editor module adapted for identifying frame characteristic of at least one entire input video frame in the bitstream, and determining whether the video frame data of the at least one entire input video frame is suitable for compressed domain editing or spatial domain processing, based on the frame characteristics of the at least one entire input video frame and the at least one editing effect specified by one or more editing parameters;
a compressed domain processing module, responsive to a determination that the video frame data of the at least one entire input video frame in the bitstream is suitable for compressed domain editing, for modifying the bitstream in the compressed domain for providing a modified bitstream indicative of said edited video frames;

a decoder, responsive to a determination that the video frame data is suitable for spatial domain processing, for decoding the video bitstream of the at least one entire input video frame into the spatial domain to provide a decoded video bitstream;

a spatial domain processing module, responsive to a determination that the video frame data is suitable for spatial domain processing, for modifying the decoded video bitstream of the at least one entire input video frame in the spatial domain for providing a modified bitstream indicative of the edited video frames.

27. The mobile phone of claim 26, further comprising:
a display screen for display video images based on modified video data.

28. A non-transitory computer readable storage medium embedded therein a software program, said software program comprising:
a code for determining, among a plurality of input video frames in a bitstream, at least one video frame for video editing to achieve a video effect, the edited video frames including at least one editing effect specified by one or more editing parameters;
a code for identifying frame characteristic of at least one entire input video frame in the bitstream;
a code for determining whether video data of the at least one entire input video frame is suitable for compressed domain editing or spatial domain processing, based on the frame characteristics of the at least one entire input video frame and the at least one editing effect specified by one or more editing parameters;
a code, responsive to a determination that the video data of the at least one entire input video frame in the bitstream is suitable for compressed domain editing, for modifying the bitstream in the compressed domain for providing a modified bitstream indicative of the edited video frames;
a code, responsive to a determination that the video data is suitable for spatial domain processing, for decoding the video data of the at least one entire input video frame into the spatial domain to provide decoded video data;
a code, responsive to a determination that the video data is suitable for spatial domain processing, for modifying the decoded video data in the spatial domain for providing a modified bitstream indicative of the edited video frames; and wherein the non-transitory computer readable storage medium is incorporated in a mobile phone equipped with a camera.

29. The non-transitory computer readable storage medium of claim 28, wherein the software program further comprises
a code for modifying video data in one or more further input video frames in a further domain different from the compressed domain based on the frame characteristics of said further input video frame and the one or more specified editing parameters so as to provide modified further video data.

30. A mobile phone equipped with a camera for editing one or more input video frames in a bitstream for providing one or more edited video frames to achieve a video effect, the edited video frames including at least one editing effect specified by one or more editing parameters, the mobile phone comprising:
means for identifying frame characteristic of at least one entire input video frame in the bitstream;
means for determining whether video data of the at least one entire input video frame in the bitstream is suitable for compressed domain editing or spatial domain processing, based on the frame characteristics of the at least one entire input video frame and the at least one editing effect specified by one or more editing parameters;
responsive to a determination that the video data of the at least one entire input video frame is suitable for compressed domain editing, means for modifying the bitstream in the compressed domain for providing a modified bitstream indicative of the edited video frames;
responsive to a determination that the video data is suitable for spatial domain processing, means for decoding the bitstream of the at least one entire input video frame into the spatial domain to provide a decoded bitstream, and means for modifying the decoded bitstream in the spatial domain for providing a modified bitstream indicative of the edited video frames.

31. The mobile phone of claim 30, further comprising:
means for converting the edited video frames into an edited media file.

* * * * *